Jan. 30, 1968     D. J. GRANT     3,365,941
PRECISION THRUST GAGE
Filed Oct. 14, 1965     3 Sheets-Sheet 3
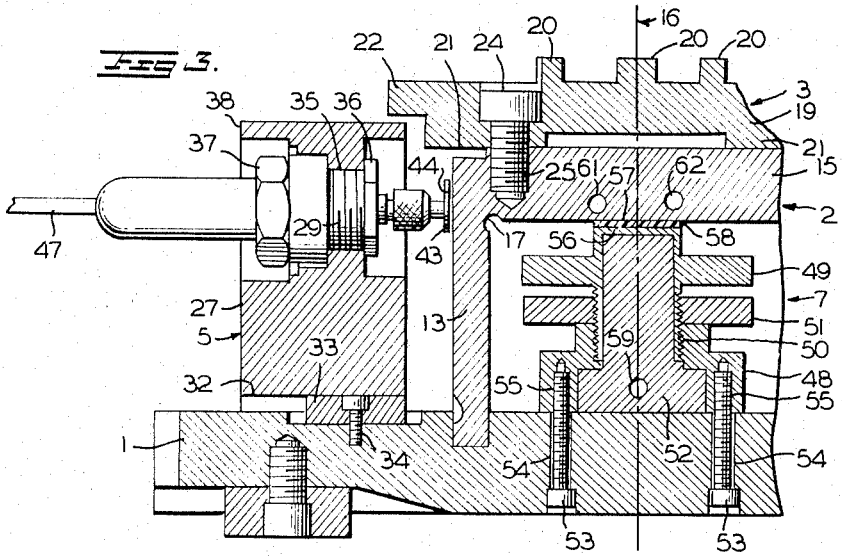
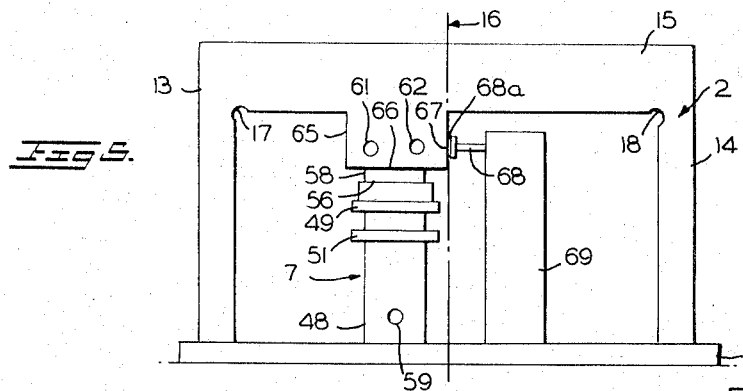
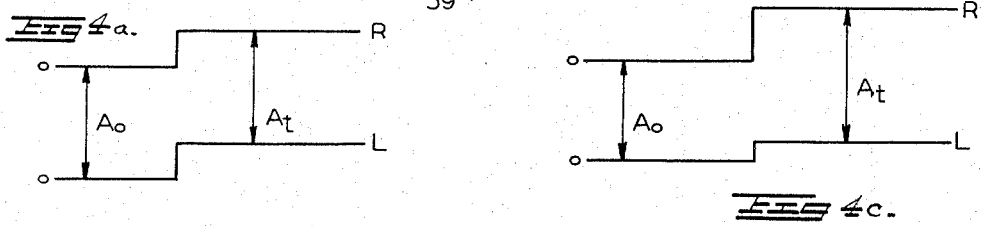
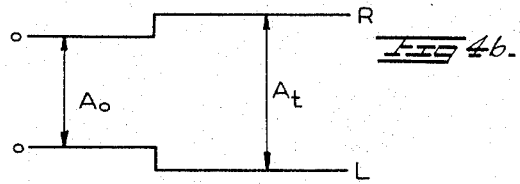
INVENTOR
Daniel J. Grant
BY
ATTORNEYS United States Patent Office 3,365,941
Patented Jan. 30, 1968

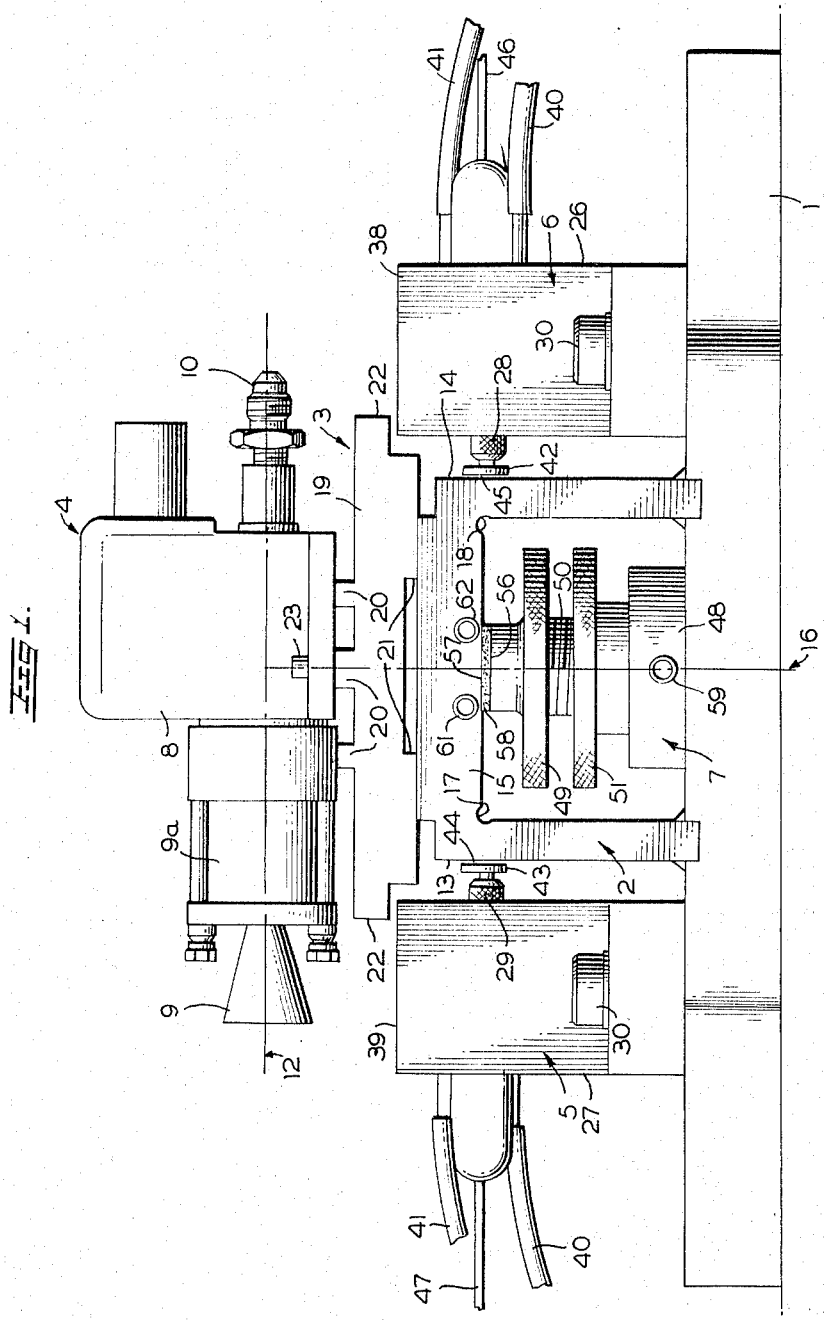

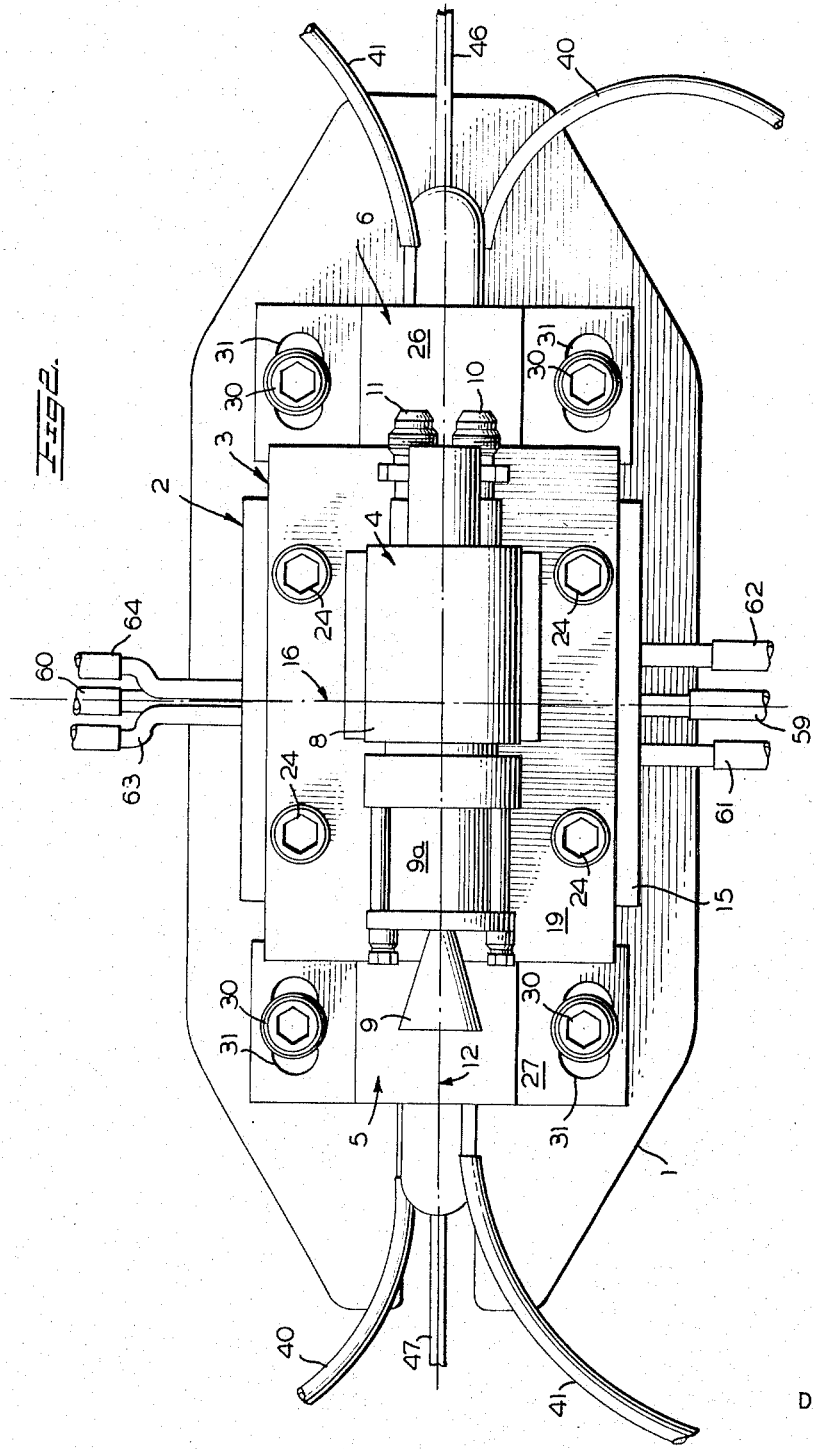

3,365,941
PRECISION THRUST GAGE
Daniel J. Grant, Chevy Chase, Md., assignor to the United States of America as represented by the Administrator of the National Aeronautics and Space Administration
Filed Oct. 14, 1965, Ser. No. 496,205
11 Claims. (Cl. 73—117)

ABSTRACT OF THE DISCLOSURE

A temperature compensated thrust measuring gage for accurately measuring forces as a function of time in an environment whose temperature varies as a function of time. The gage includes a column comprising a pair of legs and a leg connecting portion for connecting the legs at one end thereof and for providing the means to which the device to be tested is mounted. The legs are each spaced an equi-distant from and symmetrical with a reference plane with each having its other end affixedly attached to a supporting base. A pair of capacitance transducers are located in operable proximity with the legs to sense the displacement thereof, and an adjustable fluid damping assembly is provided to cooperate with the column to insure optimum response for the type of force-time characteristics to be measured.

---

The invention described herein may be manufactured and used by or for the Government of the United States of America for governmental purposes without the payment of any royalties thereon or therefor.

This invention relates to a thrust measuring gage, and more particularly to a temperature compensated thrust measuring gage adapted to accurately measure forces as a function of time in an environment whose temperature varies as a function of time.

Difficulty has been encountered in attempting to measure the thrust developed by chemical fuel rockets and other propulsion or directed gas generating devices, which give off large quantities of heat during operation. This heat causes thermal expansion of the components of the thrust measuring gage which may be of the same order of magnitude as the thrust produced deflections, thereby resulting in inaccurate thrust measurements.

Numerous attempts have been made to overcome or compensate for the thermal expansion of thrust or like gages. However, previous efforts have lead either to gages having cumbersome cooling systems for the gage components, or gages which while able to measure forces under steady state temperature conditions are not able to accurately measure forces under transient temperature conditions.

It is therefore an object of the present invention to provide a gage designed to compensate for thermal expansion of the gage components, while not being subject to the objections mentioned above.

A specific object of the present invention is to provide a temperature compensated gage designed to differentiate between a signal caused by thermal expansion and one caused by thrust.

A further object of the present invention is to provide a temperature compensated gage having means to provide reference surface not subject to deflection due to thermal expansion of the gage in combination with means to measure the deflection of the reference surface due to thrust.

A still further object of the present invention is to provide a temperature compensated gage adapted to measure the thrust produced by a device under transient temperature conditions.

A further object of the present invention is to provide a temperature compensated gage having means to provide a constant predetermined damping force on the gage to provide opitmum response for the time-force characteristic to be measured.

Other objects and features of the present invention will become apparent from the following description taken in connection with the accompanying drawings in which:

FIG. 1 is a side elevational view of the thrust gage of the present invention, showing a thrust generating device in testing position;

FIG. 2 is a top plan view of the thrust gage of the present invention;

FIG. 3 is a sectional view taken generally along the line 3—3 of FIG. 2, but showing the thrust generating device removed;

FIGS. 4A, B, and C illustrate signals of the type produced on an oscilloscope which characterize, respectively, heat-no load, load-no heat, and normal operating conditions of the thrust gage of the present invention; and FIG. 5 is a diagrammatic side elevational view of an alternative embodiment of the present invention.

Referring particularly to FIGS. 1, 2, and 3, there will be seen that the test gage of the present invention includes a supporting base 1; a column or seismic member, generally indicated as 2; a connecting or adapter plate 3 by which a thrust generating device to be tested, generally shown as 4, is mounted on column 2; a pair of transducer assemblies 5 and 6; and a fluid damping assembly, generally shown as 7.

For illustration purpcses only, the device to be tested is shown in the form of a small bipropellant rocket motor having a combustion chamber 9a, enclosed at one end within housing 8, and gas exhaust nozzle 9. Suitable propellants may be fed to the combustion chamber through fittings 10 and 11, and gases exhausted from nozzle 9 to define a thrsut axis 12. It will be appreciated that the gage of the present invention may be employed to measure thrust produced by any other type of reaction device.

Column 2 is illustrated as being machined from a solid block of metal having a generally U-shaped design. Column 2 includes a pair of leg portions 13 and 14 which are affixed at their free ends to supporting base 1 by welding and a leg connecting portion 15 which is disposed parallel to the supporting base. It will be appreciated that leg portions 13 and 14 and the connecting portion 15 are symmetrical about a reference plane 16 disposed equidistant between the leg portions and that upon the application of heat to portion 15, equally with respect to reference plane 16, leg portions 13 and 14 will deflect by equal amounts away from the reference plane. Column 2 may also be provided with suitable stress relieving cut-out portions 17 and 18.

While column or seismic member 2 is illustrated for purposes of discussion as being of one-piece construction, it will be appreciated that alternative multi-part construction may be employed. In a preferred embodiment, pins are employed to connect leg portions 13 and 14 to leg connecting portion 15, thereby eliminating moments which are produced by a thrust load in the case of one-piece column design. The play between the pins and the column parts is eliminated by preloading, as by bending, the leg portions 13 and 14 with connecting portion 15 which acts as a tension member. In this pin-connected embodiment, the design computations of the dimensions of leg portions 13 and 14 are simplified, because, in essence, the thrust load produced by device 4 is equally distributed as concentrated loads applied to the ends of simple cantilever beams.

The connecting or adapter plate 3 for purposes of illustration is shown as being machined from a solid block of metal to provide a main body portion 19, upper and lower spacer elements 20 and 21 respectively, and end projections 22 for the purpose hereinafter discussed. If desired spacer elements 20 and 21 may be formed separately from body portion 19 and affixed thereto by any suitable means, not shown, and if desired lower spacer element 21 may be formed integrally with leg connecting portion 15. Device 4 may be removably affixed to plate 3 by any suitable means such as bolts 23, only one of which is shown in FIG. 1, and the plate 3 may be affixed to column 2 by means of threaded bolts 24 which are received in threaded openings 25 in the connecting portion 15 of column 2. It will be appreciated that plate 3 and associated spacer elements are symmetrical with respect to reference plane 16, and that the device to be tested is mounted in such a manner as to insure that heat radiated and conveyed away from the device to the plate 3 is equally distributed about the reference plane 16. Also, it will be apparent that plate 3 acts to equally distribute and thereafter convey heat along equal paths to portion 15 through spacer elements 21.

The transducer assemblies 5 and 6, include brackets 26 and 27 which act to both support and provide heat shields for displacement transducers 28 and 29. Brackets 26 and 27 are adjustably mounted on the supporting base 1 by means of bolts 30, which are threaded into holes, not shown, in the base, and are received within slots 31 provided in the brackets.

As shown in FIG. 3 in the case of bracket 27, motion of brackets 26 and 27 normal to reference plane 16 is insured by means of a guide formed by a slot 32 provided in the bottom surface of the brackets and a slot engaging key 33 which is affixed to base 1 by means of a threaded bolt 34.

Again referring to FIG. 3, transducers 28 and 29 are mounted within openings 35 provided in brackets 26 and 27, and retained therein by any suitable means such as nuts 36 and 37. Suitable insulation, not shown, may be provided to reduce the amount of heat transferred from the brackets to the transducers.

It will be noted by referring to FIGS. 1 and 3 that the end projections 22 of plate 3 overlie the upper portions 38 and 39 of brackets 26 and 27 and act to form therewith a tortuous path to prevent the direction radiation of heat from device 4 to the front portions of transducers 28 and 29 or the leg portions 13 and 14 of column 2. If desired, the upper portions 38 and 39 of brackets 26 and 27 may be extended in directions away from column 2 to insure against direct radiation of heat from device 4 to the rear portions of the transducers, and the transducers may be water cooled by means including inlet conduits 40 and outlet conduits 41.

The transducers employed in the practice of the present invention are of the capacitance variety, wherein variations in the gaps 44 and 45, i.e., the spacing between leg portions 13 and 14 and transducer plates 43 and 42, respectively, act to effect electrical circuitry change of capacitance in tank circuits of suitable oscillator-demodulator units, not shown, that are connected to the transducers 28 and 29 by leads 46 and 47, respectively. The oscillator-demodulator units use a change of capacitance to vary the frequency of oscillators, not shown, whose output is demodulated to produce a DC level trace. The demodulated signal is then recorded on a multi-channel galvanometer oscilloscope, not shown, to indicate the displacement of column leg portions 13 and 14, and thus the thrust produced by device 4.

The employment of a capacitance transducer of the type disclosed, permits the displacement sensor, which is electrical, to be dynamically isolated from the mechanical column 2, both in its mounting and in its signal transduction means. This arrangement permits the deflection of column 2 to be measured more accurately than would be the case where positive contact displacement transducers or strain gages are employed.

Prior to testing, the transducer plates 42 and 43 are adjustably spaced a substantially equal distance from leg portions 13 and 14 by suitable means, as by adjustable brackets 26 and 27, and the signals of the transducers balanced so as to produce an equal change of amplitude, as recorded, for an equal change of loading, i.e., equal change of displacement of the leg portions 13 and 14 in directions away from reference plane 16.

Since the column 2 is symmetrical about reference plane 16, a balanced thermal input, without thrust loading, to connecting portion 15 will produce an equal displacement of leg portions 13 and 14 and thus an equal shift of the recorded traces. This condition is illustrated in FIG. 4A, wherein traces R and L represent, respectively, the signals produced by transducers 28 and 29. The amplitude $A_0$ prior to heat application is equal to amplitude $A_t$ at any given time after heat application. It will be appreciated that traces R and L are separated by $A_0$ for the purpose of illustrating the performance of the gage under several possible loading conditions, and that in actual practice the reference no load signals may be superposed.

FIG. 4B illustrates the traces produced by transducers 17 and 29 in the case where thrust is produced by device 4 without heating effects and the gage is exposed to normal atmospheric temperature. It will be apparent that upon firing of device 4, the leg portions 13 and 14 are displaced to the right of the apparatus, as viewed in FIG. 1, thereby increasing the loading on transducer plate 42 and reducing the loading on transducer plate 43. Thus, due to the symmetrical design of column 2, the traces R and L at any given time after firing will be equally and oppositely displaced from the traces prior to firing.

FIG. 4C illustrates traces R and L before firing and at a given time after firing, when leg portions 13 and 14 are simultaneously subjected to both thrust and thermal deflections. It will be apparent that the traces illustrated in FIG. 4C are obtained by merely superimposing the traces illustrated in FIGS. 4A and 4B.

From the above it will be apparent that by a summation of the signals produced by the displacements of leg portions 13 and 14, wherein displacements due to temperature cancel and displacements to the thrust add, there is obtained a value which provides an output that is twice that of a single transducer and corresponds to the amount of thrust produced by device 4 at any given time after firing. From the above it will be appreciated that accurate values of thrust may be obtained at any time during the firing sequence irrespective of the relative magnitudes of displacements due to thrust and heat or transient temperature conditions.

The fluid damping assembly 7, shown in FIGS. 1 and 3, is provided to adjust the performance of the gage to provide optimum response for the type of forced-time characteristics desired to be measured and to reduce undesired vibration of column 2. Assembly 7 includes a base 48, a cap 49 which is adjustably positioned with respect to the base 48, by threaded connection 50, a conventional lock nut 51, and a stepped cylindrical guide insert 52. A plurality of threaded bolts 53, passing upwardly through holes 54 in supporting base 1 and received in threaded openings 55 of base member 48, are employed to firmly position the damping assembly on supporting base 1.

Referring to FIGS. 1 and 3, it will be seen that the upper surface 56 of cap 49 and the lower surface 57 of connecting portion 15 form damping surfaces between which is disposed a very viscose damping fluid 58, such as a silicone compound. It will be apparent that adjustment of cap 49 to vary the distance between damping surfaces 56 and 57 permits the damping coefficient of the assembly to be varied.

To provide a uniform temperature at damping surfaces 56 and 57, and thus maintain viscosity and damping rates of the fluid constant, there is provided a system of cooling fluid ducts, illustrated in the FIGS. 1, 2, and 3. Ducts 59 and 60 represent, respectively, the inlet and outlets employed in cooling damper assembly 7. Ducts 61, 62 and 63, 64 represent, respectively, the inlet and outlet ducts employed in cooling the damping surfaces of leg connection portion 15. It will be appreciated that the system of ducts shown in the drawings are merely for illustrative purposes and any suitable system may be employed. However, it is important that the ducts be maintained normal to thrust axis 12, so as to prevent inaccuracies in thrust measurement caused by dynamic loading produced by fluid motion within the cooling system.

An alternative embodiment of the present invention is illustrated in FIG. 5, wherein one rather than two displacement transducers may be employed to determine thrust. In this embodiment the leg connecting portion 15 is provided with means 65 projecting towards supporting base 1. Means 65 performs the two-fold function of providing a damping surface 66 and a plane or reference surface 67. As in the case of transducers 28 and 29, the plate of transducer 68, which is supported within a transducer bracket 69, is spaced from reference surface 67, as indicated at 68a. Column 2 is designed to provide a uniform heat path on either side of reference plane 16 and the surface 67 is disposed coincident with plane 16, thereby permitting the position of surface 67 to be independent of temperature variations, when the device 4 is mounted so that heat flux is equally distributed on either side of the reference plane 16. It will be appreciated that a connecting plate, similar to plate 3, may be supported on column 2 and that damping assembly 7 may be associated with column 2 in a manner other than that shown.

In the testing of device 4 by the apparatus illustrated in FIGS. 1, 2, and 3, the device is first mounted on the connecting or adapter plate 3 and adjusted to insure that the net heat flux passing to column 2 is equally distributed on opposite sides of the reference plane 16. Also, it is desirable to mount the device in such a manner that the thrust axis 12 is disposed normal to the reference plane 16 to thereby avoid subsequent errors of thrust measurement caused by thrust vector misalignment with the displacement axis of the transducer plates.

The damping assembly 7 may then be adjusted to provide a desired damping constant and the cooling fluid may be supplied to assembly 7 and leg connecting portion 15 to insure the maintenance of uniform temperature at the damping surfaces.

The transducer plates 42 and 43 are then spaced from the outer surfaces of legs 13 and 14 to produce the initial required sensitivity, and the oscillator-demodulator units are adjusted to produce a desired output signal.

After device 4 is fired, the thrust produced at any given time may be calculated from the traces of the signals produced by the transducers, as illustrated in FIG. 4C, by subtracting the L trace from the R trace to obtain a value corresponding to the thrust load.

Steps employed in testing device 4 by the apparatus illustrated in FIG. 5 would be the same as discussed above except that the transducer 68 would directly measure the thrust produced, there being no displacement of surface 67 due to thermal expansion of column 2.

While only two embodiments of the invention have been shown in the accompanying drawings, it will be evident that various other modifications thereof are possible without departing from the scope of the invention.

What is claimed is:

1. A temperature compensated gage for measuring thrust developed by a device being tested which comprises: a column, said column being of generally U-shaped cross-sectional design having leg portions affixed at one end thereof to a supporting base and having a leg connecting portion affixed to the other end of said leg portions, said leg portions and said leg connecting portion being an integral unit and symmetrical about a reference plane spaced equidistant from said leg portions; means for connecting a device to be tested to said leg connecting portion in such a manner that the device when tested produces a component of thrust disposed normal to said reference plane; and means responsive to the displacement of said column in the direction of said thrust component to indicate the thrust developed by a device being tested.

2. The gage of claim 1, wherein said leg connecting portion is provided with projecting means, said projecting means forming a plane surface parallel with said reference plane, and said responsive means includes a displacement transducer means in operable proximity with said plane surface.

3. The gage of claim 1, wherein said responsive means includes displacement transducer means disposed in operable proximity with said leg portions.

4. The gage of claim 1, wherein the device connecting means includes a plate member superimposed on said leg connecting portion, and spacing means are provided to define heat conductive paths from a device being tested to said plate member and from said plate member to said leg connecting portion, respective paths on either side of said reference plane being of equal lengths.

5. The gage of claim 1, wherein said displacement responsive means includes a pair of displacement transducers one associated with each of said leg portions, said transducers being adapted to produce signals indicating displacements of said leg portions.

6. The gage of claim 5, wherein bracket means are employed to support said transducers, said bracket means including means to provide a heat shield to minimize transfer of heat from a device being tested to said transducers.

7. The gage of claim 1, wherein damping means are provided to control the dynamics of said column.

8. The gage of claim 7, wherein said column is provided with a damping surface, and said damping means includes a first part, a second part having a damping surface disposed parallel to said column damping surface, and a viscous damping fluid disposed between said damping surfaces, said second part being adjustable with respect to said first part to vary the distance between said damping surfaces.

9. The gage of claim 8, wherein cooling fluid means are provided within said column and said damping means to maintain the temperature of said damping surfaces constant, and fluid inlets to said column cooling means being disposed normal to said thrust axis.

10. The gage of claim 7, wherein the leg connecting portion is provided with a planar damping surface, and said damping means includes a first part, a second part having a planar damping surface disposed parallel to said connection portion damping surface, and a viscous damping fluid disposed between said damping surfaces, said second part being adjustable with respect to said first part to vary the distance between said damping surfaces.

11. The gage of claim 10, wherein cooling fluid means are provided within said leg connecting portion and said damping means to maintain the temperature of said damping surfaces constant, and fluid inlet lines for said leg connecting portion cooling means are disposed normal to said thrust axis.

References Cited

UNITED STATES PATENTS 2,790,322    4/1957    Grimes et al. _____ 73—116

RICHARD C. QUEISSER, *Primary Examiner.*

JERRY W. MYRACLE, *Assistant Examiner.*